United States Patent
Lidji et al.

(10) Patent No.: US 7,707,335 B2
(45) Date of Patent: Apr. 27, 2010

(54) DEVICE AND METHOD FOR MANAGING A RETRANSMIT OPERATION

(75) Inventors: Gil Lidji, Zur Yiga'Al (IL); Dan Ilan, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 184 days.

(21) Appl. No.: 12/090,116

(22) PCT Filed: Feb. 2, 2006

(86) PCT No.: PCT/IB2006/050355

§ 371 (c)(1),
(2), (4) Date: Apr. 17, 2008

(87) PCT Pub. No.: WO2007/042948

PCT Pub. Date: Apr. 19, 2007

(65) Prior Publication Data

US 2008/0215306 A1    Sep. 4, 2008

(30) Foreign Application Priority Data

Oct. 14, 2005    (WO) ................ PCT/IB2005/053381

(51) Int. Cl.
*G06F 3/00* (2006.01)
*G06F 13/36* (2006.01)

(52) U.S. Cl. .................... 710/52; 710/310; 714/749

(58) Field of Classification Search ............. 710/52–60, 710/310; 365/221, 189; 714/749
See application file for complete search history.

(56) References Cited

U.S. PATENT DOCUMENTS

| 5,365,485 | A | | 11/1994 | Ward et al. |
| 5,712,992 | A | | 1/1998 | Hawkins et al. |
| 5,933,435 | A | * | 8/1999 | Shah et al. .................. 714/749 |
| 6,745,265 | B1 | | 6/2004 | Sindalovsky |
| 6,934,198 | B1 | | 8/2005 | Lowe et al. |
| 7,162,545 | B2 | * | 1/2007 | Sudo .......................... 709/201 |
| 7,200,790 | B2 | * | 4/2007 | Sharma et al. .............. 714/749 |
| 7,500,153 | B2 | * | 3/2009 | Jun ............................. 714/54 |
| 2005/0015650 | A1 | * | 1/2005 | Jun ................................ 714/5 |
| 2005/0152350 | A1 | * | 7/2005 | Sung et al. .................. 370/376 |

* cited by examiner

Primary Examiner—Christohper B Shin (57) ABSTRACT

A method and device for managing retransmit operations. The device, includes a FIFO memory unit, a read pointer, a retry pointer and a write pointer. The device is characterized by including a gray code state machine connected to an emulated read pointer logic; whereas the gray code state machine is adapted to provide a gray code word representative of a state of a read logic that comprises the read pointer; whereas the emulated read pointer logic is adapted to process at least one gray code word and to provide an emulated read pointer that tracks a FIFO memory unit entry that stores data that was not accepted; whereas the emulated read pointer logic is connected to a write control logic adapted to control writing operations to the FIFO memory unit in response to the emulated read pointer logic; and whereas the read logic receives a read clock that differs from a write clock provided to the emulated read pointer logic and to the write control logic.

20 Claims, 5 Drawing Sheets

DEVICE AND METHOD FOR MANAGING A RETRANSMIT OPERATION

FIELD OF THE INVENTION

The invention relates to methods for managing a retransmit operation and a device having retransmission capabilities.

BACKGROUND OF THE INVENTION

Telecommunication integrated circuits are typically required to exchange information with one or more data sources and data targets. A telecommunication integrated circuit may have a processor that can process data and then send it to the one or more data targets.

In many cases the data is sent to a FIFO memory unit (also referred to as FIFO) that can partially compensate for timing differences between FIFO read operations performed by a slow retrieving data target and FIFO write operations performed by a fast component. U.S. Pat. Nos. 5,712,992 of and 5,365,485, both being incorporated herein by reference, provide examples of prior art FIFO management methods and devices.

The FIFO has to be managed in order to prevent overwriting of valid information. The complexity of a FIFO management circuit increases when there are timing differences between the FIFO read and write operations and especially when the data target can request to retransmit data from the FIFO.

There is a need to provide efficient devices and methods for managing retransmit operations.

SUMMARY OF THE PRESENT INVENTION

A method for managing a retransmit operation and a device having retransmission capabilities, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
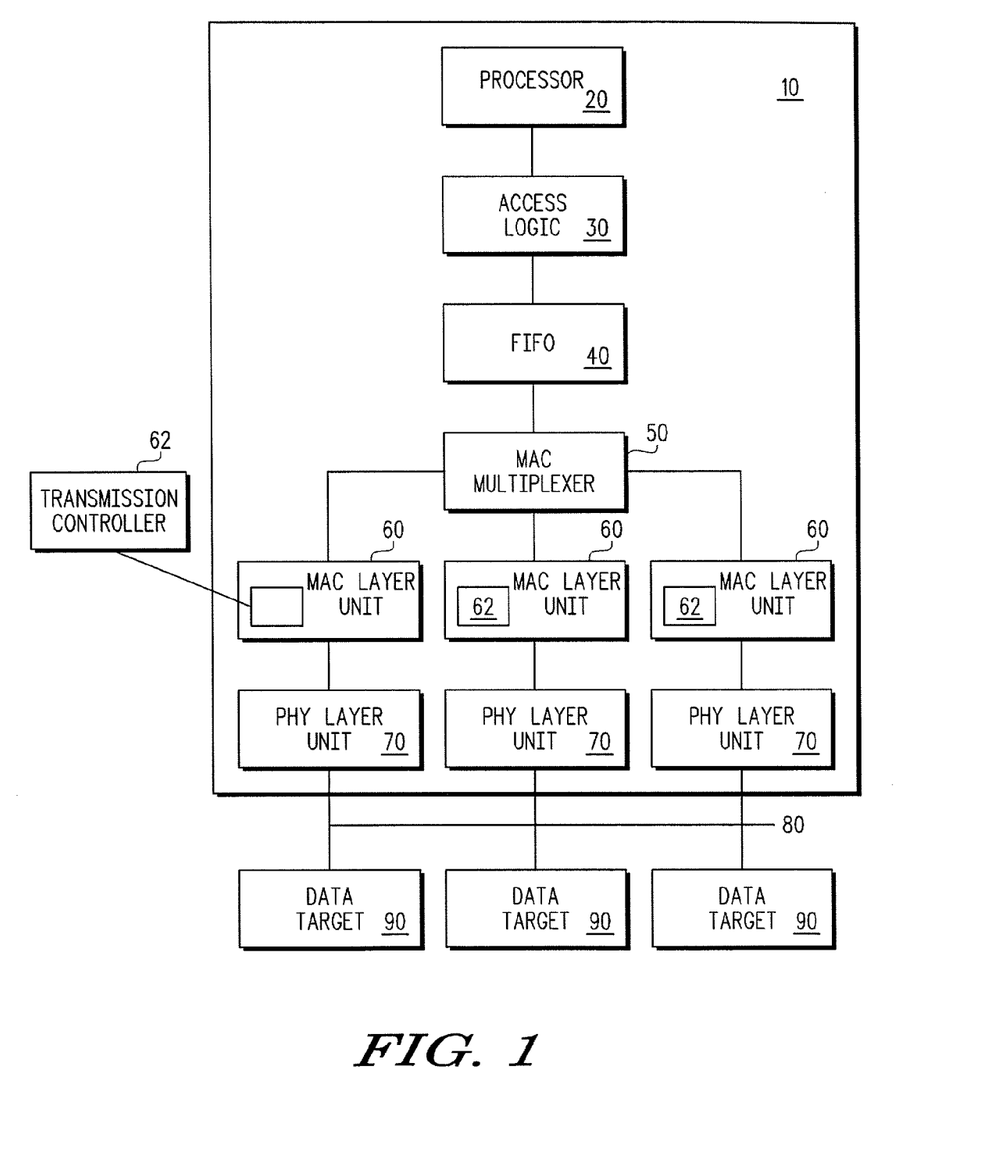
FIG. 1 illustrates a device, according to an embodiment of the invention.

FIG. 1 illustrates a device 10, according to an embodiment of the invention.

Device 10 uses gray code encoding. A Gray code is an encoding of numbers so that adjacent numbers have a single digit differing by one.

Device 10 can include one or more integrated circuits, can be a part of an integrated circuit and can include at least one integrated circuits as well as additional components.

Device 10 conveniently includes a processor 20, access logic 30, FIFO memory unit (FIFO) 40, MAC layer multi-plexer 50, multiple MAC units 60, PHY layer units 70 and an output bus 80. The output bus 80 is connected to multiple data targets collectively denoted 90. The data targets 90 can belong to device 10 although this is not necessarily so.

At least one of the data targets 90 can request to retransmit previously retrieved data. It is noted that the transmission of data to the data target as well as any re-transmission operations are controlled by a transmission controller 62 and that the transmission controller can actually send various signals (including signals representing a re-transmission request) to the access logic 100, either instead of data targets 90 or in addition to data targets. The inventors used a device in which the retransmission requests were generated by the transmission controller 62.

The multiple MAC units 60 can support different protocols such as but not limited to Ethernet, ATM, UART, HDLC and the like. The MAC layer multiplexer 50 selected between the different MAC units 60 in response to the used protocol. Each MAC layer unit includes a transmission controller, such as transmission controller 62, that controls the read operations.

It is noted that device 10 can include other MAC layer components and that the MAC multiplexer 50 is optional.

The access logic 30 includes read logic 100 and write logic 200. The processor 20 and the write logic 200 receive a clock signal (referred to as write clock) that is faster than the clock signal (referred to as read clock) provided to the multiple MAC units 60, the PHY layer units 70, output bus 80 and to the read logic 100. Conveniently the data targets 90 also receive a slower clock.

Processor 20 usually writes data to FIFO 40 while the transmission controller 62 reads data from FIFO 40. The read operations are not synchronized or coordinated with the write operations. In order to prevent overwriting of valid information the processor 20 is notified when FIFO 40 is full.

It is noted that the read clock and the write clock can differ from each other but this is not necessarily so.

Due to possible differences between the read clock and the write clock the write logic 200 emulates the state of the read logic 100 that is based on a robust representation of the state of the read logic. More specifically a sequence of the read logic operations is represented in transitions of the gray code state machine 150. The state (in the form of a gray code word) of the gray code state machine 150 is provided to the write logic 200. The write logic 200 compares between a currently provide gray code word and a previously provided gray code word and in response determines the state of the read logic 100. The states of the gray code state machine are encoded (by gray code words) in such a way so that each possible state transition of the gray code state machine 150 causes only one bit of a current output signal (gray code word) to be changed in relation to a previous gray code word representing the state before the transition.

The gray code state machine 150 sends a gray code word representative of the state of the read logic 100 to the write logic 200. The write logic 200 receives the gray code word and determines the state of the read logic according to the difference between a previous code word and a current code word. The write logic 200 can compare the state of the read logic 100 to the state of the write logic 200 and determine that FIFO 40 is full.

Conveniently, the data is arranges as data frames. The size of a data frame can differ from the size of the FIFO entries, but this is not necessarily so. At least one data target can have an input port that is smaller than the entry size of the FIFO an/or the size of the data frame. For example, the inventors used a FIFO 40 that had 8-byte long entries, a data target that has a input port of one byte long and a frame size that can be at least one byte.

Conveniently, the integrated circuit 10 is adapted to monitor the transmission of data bytes to the data target and determine when a transmission of a data frame ends.

Figure 2:
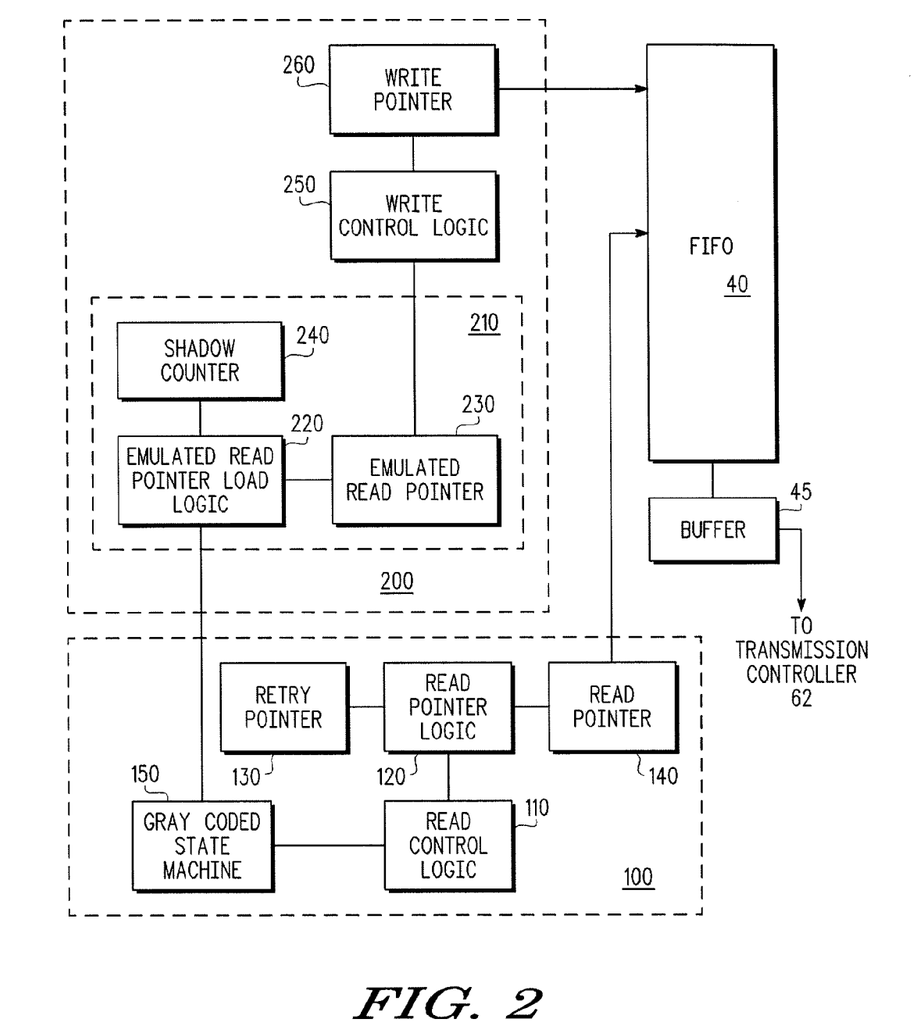
FIG. 2 illustrates a FIFO, read logic and write logic, according to an embodiment of the invention.

FIG. 2 illustrates FIFO 40, read logic 100 and write logic 200, according to an embodiment of the invention.

FIFO 40 includes multiple 8-byte entries. Each entry is read into a 8-byte buffer 45. The content of buffer 45 is read, part by part (for example byte after byte), by controller 62. This operation is controlled by transmission controller 62. It is noted that such a buffer 45 is optional, especially when the size of the FIFO entry equals the size of an input port of the data target 90.

According to an embodiment of the invention the read logic 100 can interact with the data target while according to other embodiments of the invention the read logic interacts with the transmission controller 62 that in turn interacts with the data targets. Those of skill in the art will appreciate that various control signals, acknowledgement signals and the like can be sent to the read logic 100 by transmission controller 62 and/or by the data target 90. It is assumed, for convenience of explanation that the transmission controller 62 sends control and acknowledgement signals to the read logic 100.

The read logic 100 includes a read pointer 140, retry pointer 130, read pointer logic 120, read control logic 110 and gray coded state machine 150.

The read control logic 110 is connected to the read pointer logic 120 and to the gray coded state machine 150. The read pointer logic 120 is connected to the read pointer 140 and to the retry pointer 130.

The write logic 200 includes emulated read pointer logic 210, write control logic 250 and write pointer 260. The emulated read pointer logic 210 includes emulated read pointer load logic 220, shadow counter 240, emulated read pointer 230.

The emulated read pointer load logic 220 is connected to the shadow counter 240 and to the emulated read pointer 230. The write control logic 250 is connected to the write pointer 260 and to the emulated read pointer 230.

The read control logic 110 receives the following read related signals: read signal 111, Tx_last signal 112, Tx_last_issued signal 113, Accept signal 114, Accept_issued signal 115, Accept_on signal 116 and Retry signal 117.

Read signal 111 indicates that a FIFO entry should be read. Tx_last signal 112 indicates a completion of a transfer of last part of a data frame.

It is noted that the size of the data frame can vary according to various constraints imposed by a currently used communication protocol, by processor characteristics, by data target characteristics and the like. For example, the data target bus width can vary so that the data target an unpack data entries read from FIFO into a different interface size.

Tx_last_issued signal 113 indicates that a last part of a current data frame is or has been transferred to a data target and that a transmission of a next data frame did not start. Accept signal 114 indicates that the data target accepted the data frame. Accept_issued signal 115 indicates that the data target issued an accept indication for a current data frame and that the transmission of the next frame did not start. Accept_on signal 116 indicates that the data target does not support retransmission. Retry signal 117 indicates that a retransmission request was issued by the data target.

Accept_on signal 116 represents the data target and is not expected to change during the operation of FIFO 40.

These signals can be generated by the data target 90, by the read control logic 110, and/or by the transmission controller 62 of FIG. 2. For example, Accept signal 114, Accept_on signal 116, retry signal 117 are generated by the transmission controller 62 while Tx_last_issued signal 113, Accept_issued signal 115 are generated by the read control logic 110.

The retry pointer 130 points to the FIFO entry that follows the last FIFO entry that stored data that was successfully transmitted (the transmission was accepted). The difference between the retry pointer 130 and the read pointer 140 indicate the retry size—the number of entries that their data was transmitted without receiving an accept signal.

Retransmission of data from FIFO 40 is facilitated by retrieving a retry address from the retry pointer 130. If a retransmission is required the retry address is retrieved from the retry pointer 130 and sent to the read pointer 140 via the read pointer logic 120. The retry pointer 130 is conveniently updated in response to transmissions that occur after the reception of an accept signal 116 (e.g. at the start of the next frame).

The accept signal 116 indicates that data that was retrieved from FIFO 40 can be deleted, as it will be not retransmitted. The read pointer logic 120 increments the read pointer 140 after a read operation or sends it the retry address when a retransmission starts.

The read control logic 110 controls the read pointer logic 120 and sends read status information to the gray coded state machine 150.

The read status information includes eleven signals referred to as condition1—contition11 161-171. Condition1 signal 161 is sent if read signal 111 is asserted and accept_issued signal 115 is negated. Condition2 signal 162 is sent if both tx_last_issued signal 113 and accept_issued signal 115 are asserted. Condition3 signal 163 is sent if accept_issued signal 115 and read signal 111 are asserted and tx_last signal 112 is negated.

Condition4 signal 164 is sent if tx_last signal 112 is asserted and accept_on signal 116 is negated. Condition5 signal 165 is sent if read signal 111, tx_last signal 112 and accept_on signal 116 are asserted or if read signal 111 is asserted and tx_last signal 112 is negated. Condition6 signal 166 is sent if read signal 111, tx_last signal 112 and accept_on signal 116 are asserted.

Condition7 signal 167 is asserted if read signal 111 and accept_issued signal 115 are asserted. Condition8 signal 168 is sent if tx_last signal 112 is asserted and accept_on signal 116 is negated or if read signal 111, tx_last signal 112 and accept_on signal 116 are asserted. Condition9 signal 169 is sent if retry signal 117 is asserted.

Condition10 signal 170 is sent if read signal 111 is asserted and accept signal 114 is negated. Condition11 signal 171 is sent if read signal 111 and accept_issued signal 115 are asserted.

The shadow counter 240 counts the number of entries that were read from FIFO 40 without receiving an accept signal. When an indication of an accept signal is received (the indication is learnt from the change in the state of the finite state machine) the value of the emulated read pointer 230 is updated by the number of accepted entries. If an indication of a retry request is received (the indication is learnt from the change in the state of the finite state machine) the shadow counter 240 is reset.

Figure 3:
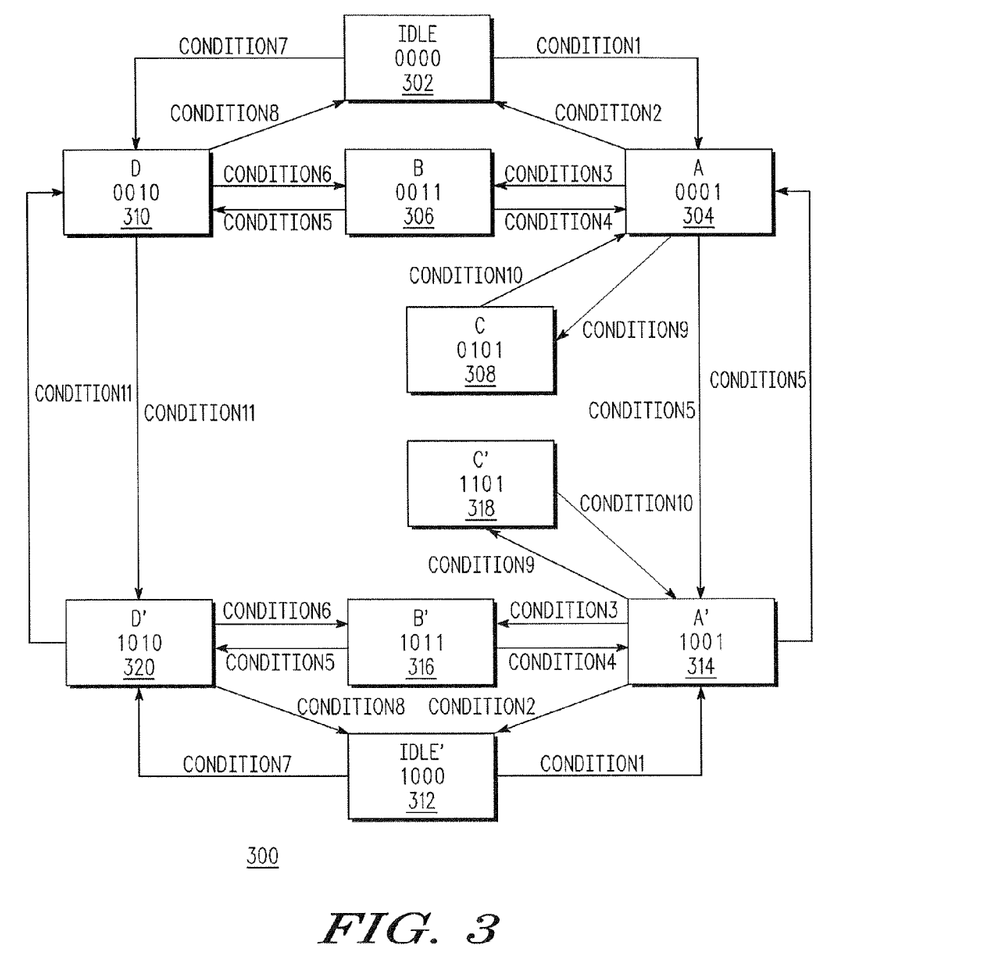
FIG. 3 is a state diagram of a state machine that belongs to the access logic, according to an embodiment of the invention.

FIG. 3 is a state diagram of the gray coded state machine 150, according to an embodiment of the invention.

Each state is represented by a box. Each box illustrates the gray code word that is sent to the emulated read pointer load logic 220.

TABLE 1 illustrates the following states and the conditions that cause the gray coded state machine to skip from one state to another.

TABLE 1

| Current state | Gray code of current state | Received signal | Next state | Gray code of next state |
|---|---|---|---|---|
| IDLE 302 | 0000 | Condition1 | A 304 | 0001 |
| IDLE 302 | 0000 | Condition7 | D 310 | 0010 |
| A 304 | 0001 | Condition2 | IDLE 302 | 0000 |
| A 304 | 0001 | Condition5 | A' 314 | 1001 |
| A 304 | 0001 | Condition9 | C 308 | 0101 |
| A 304 | 0001 | Condition3 | B 306 | 0011 |
| B 306 | 0011 | Condition5 | D 310 | 0010 |
| C 308 | 0101 | Condition10 | A 304 | 0001 |
| D 310 | 0010 | Condition8 | IDLE 302 | 0000 |
| D 310 | 0010 | Condition6 | B 306 | 0011 |
| D 310 | 0010 | Condition11 | D' 320 | 1010 |
| IDLE' 302 | 1000 | Condition1 | A' 314 | 1001 |
| IDLE' 302 | 1000 | Condition7 | D' 320 | 1010 |
| A' 314 | 1001 | Condition2 | IDLE' 312 | 1000 |
| A' 314 | 1001 | Condition5 | A 304 | 1001 |
| A' 314 | 1001 | Condition9 | C' 318 | 1101 |
| A' 314 | 1001 | Condition3 | B' 316 | 1011 |
| B' 316 | 1011 | Condition5 | D' 320 | 1010 |
| C' 318 | 1101 | Condition10 | A' 314 | 1001 |
| D' 320 | 1010 | Condition8 | IDLE' 312 | 1000 |
| D' 320 | 1010 | Condition6 | B' 316 | 1011 |
| D' 320 | 1010 | Condition11 | D 320 | 0010 |

The emulated read pointer logic 220 compares the current gray code word to the previous gray code word and sends the appropriate control signals to the emulated read pointer 230 and to the shadow counter 240.

TABLE 2 illustrates the signals sent by the emulated read pointer logic 220.

TABLE 2

| Previous gray code word | Current gray code word | Signal send by emulated read pointer logic |
|---|---|---|
| D | D' | Inc_rd_ptr_by_one |
| D' | D | Inc_rd_ptr_by_one |
| B | D | Inc_rd_ptr_by_one |
| B' | D' | Inc_rd_ptr_by_one |
| IDLE | D | Inc_rd_ptr_by_one |
| IDLE' | D' | Inc_rd_ptr_by_one |
| D | B | Inc_rd_ptr_by_one |
| D' | B' | Inc_rd_ptr_by_one |
| IDLE | D | Inc_rd_ptr_by_shadow |
| IDLE' | D' | Inc_rd_ptr_by_shadow |
| A | IDLE | Inc_rd_ptr_by_shadow |
| A' | IDLE' | Inc_rd_ptr_by_shadow |
| A | B | Inc_rd_ptr_by_shadow_plus_one |
| A' | B' | Inc_rd_ptr_by_shadow_plus_one |
| IDLE' | D' | Inc_rd_ptr_by_shadow_plus_one |
| IDLE | D | Inc_rd_ptr_by_shadow_plus_one |
| IDLE | A | Inc_shadow_cnt |
| A | A' | Inc_shadow_cnt |
| C | A | Inc_shadow_cnt |
| IDLE' | A' | Inc_shadow_cnt |
| A' | A | Inc_shadow_cnt |
| C' | A' | Inc_shadow_cnt |
| A | B | Reset_shadow_cnt |
| A | C | Reset_shadow_cnt |
| B | D | Reset_shadow_cnt |
| IDLE | D | Reset_shadow_cnt |
| D | D' | Reset_shadow_cnt |
| IDLE | IDLE' | Reset_shadow_cnt |
| A | IDLE | Reset_shadow_cnt |
| A' | B' | Reset_shadow_cnt |
| A' | C' | Reset_shadow_cnt |

TABLE 2-continued

| Previous gray code word | Current gray code word | Signal send by emulated read pointer logic |
|---|---|---|
| B | D' | Reset_shadow_cnt |
| IDLE' | D' | Reset_shadow_cnt |
| D' | D | Reset_shadow_cnt |
| IDLE' | IDLE | Reset_shadow_cnt |
| A' | IDLE' | Reset_shadow_cnt |

The Reset_shadow_cnt signal resets shadow counter 240. The inc_rd_ptr_by_one signal increments the emulated read pointer 230 by one. The Inc_rd_ptr_by_shadow_plus_one signal increases the emulated read pointer 230 by the value of the shadow counter plus one. The Inc_rd_ptr_by_shadow signal increases the emulated read pointer 230 by the value of shadow counter 240.

The write control logic 250 receives the emulated read pointer 230, compares it to the write pointer 260 and generates a FIFO full signal when the emulated read pointer 230 and the write pointer 260 point to the same FIFO entry.

The write control logic 250 can also output signals representative of the empty space of FIFO 40 by comparing between the emulated read pointer 230 and the write pointer 260.

When a data frame was successfully transmitted (and accepted by transmission controller 62) the emulated read pointer 230 is updated such as to reflect the size of the data frame. Thus, a single emulated read pointer update causes a group of data entries to be flushed. Device 10 and especially processor 20 that supports Direct Memory Access or burst transfers to FIFO 40 can take advantage of the knowledge of how many empty entries there are in the FIFO once read entries flushed due to accept.

The read pointer 140 points to the next entry to be read from FIFO 40, while write pointer 260 points to the next entry of FIFO 40 to be written to. It is noted that each of these pointers can point to the last read entry or the last written entry without departing from the spirit of the invention.

Figure 4:
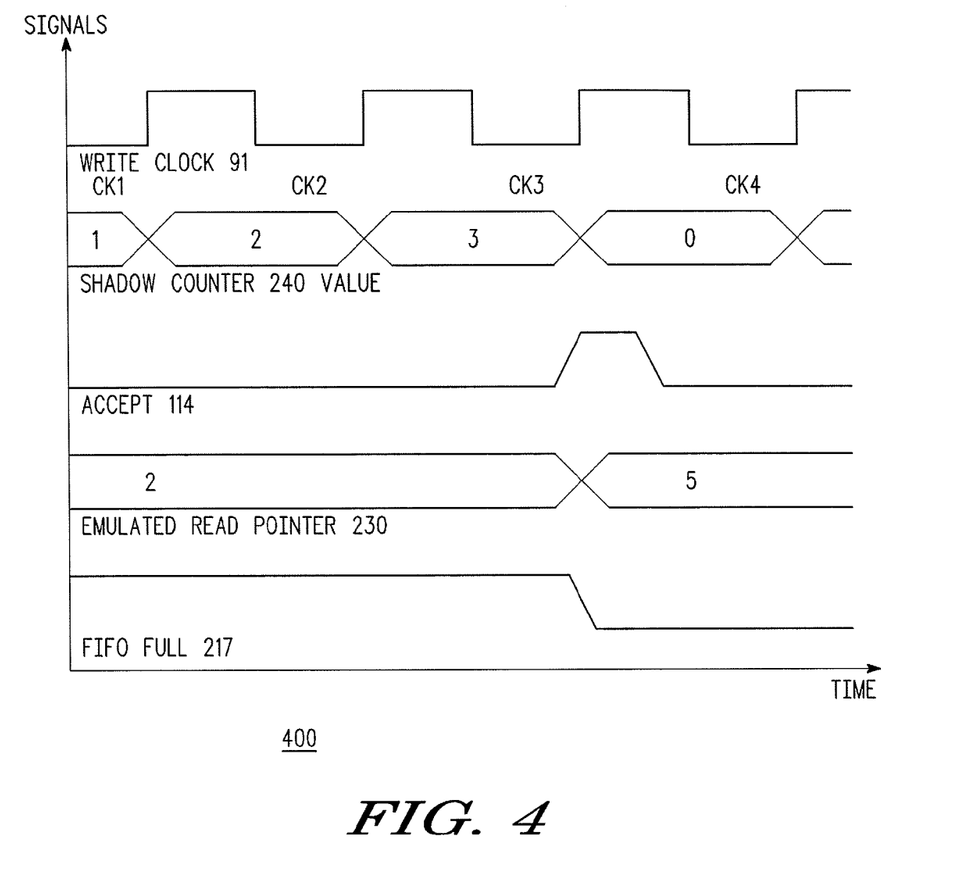
FIG. 4 is a timing diagram according to an embodiment of the invention.

FIG. 4 is a timing diagram 400 according to an embodiment of the invention.

Timing diagram 400 illustrates a write clock 91, a value of the shadow counter 240, an accept signal 114, a value of the emulated read pointer 230 and a FIFO full signal 217.

It is assumed that at an initial state the value of the shadow counter 240 is zero, the value of the emulated read pointer 230 is two and that the FIFO is full.

At a first clock cycle (CK1) an indication about a first read operation is received by the write logic 200 and the value of the shadow counter 240 is incremented to one.

At a second clock cycle (CK2) another read indication occurs and the value of the shadow counter 240 is incremented to two.

At a third clock cycle (CK3) a further read indication occurs and the value of the shadow counter 240 is incremented to three.

At the fourth clock cycle (CK4) an accept indication is received. The value of the emulated read pointer 230 is updated from two to five, the shadow counter is reset and the FIFO full signal is negated.

Figure 5:
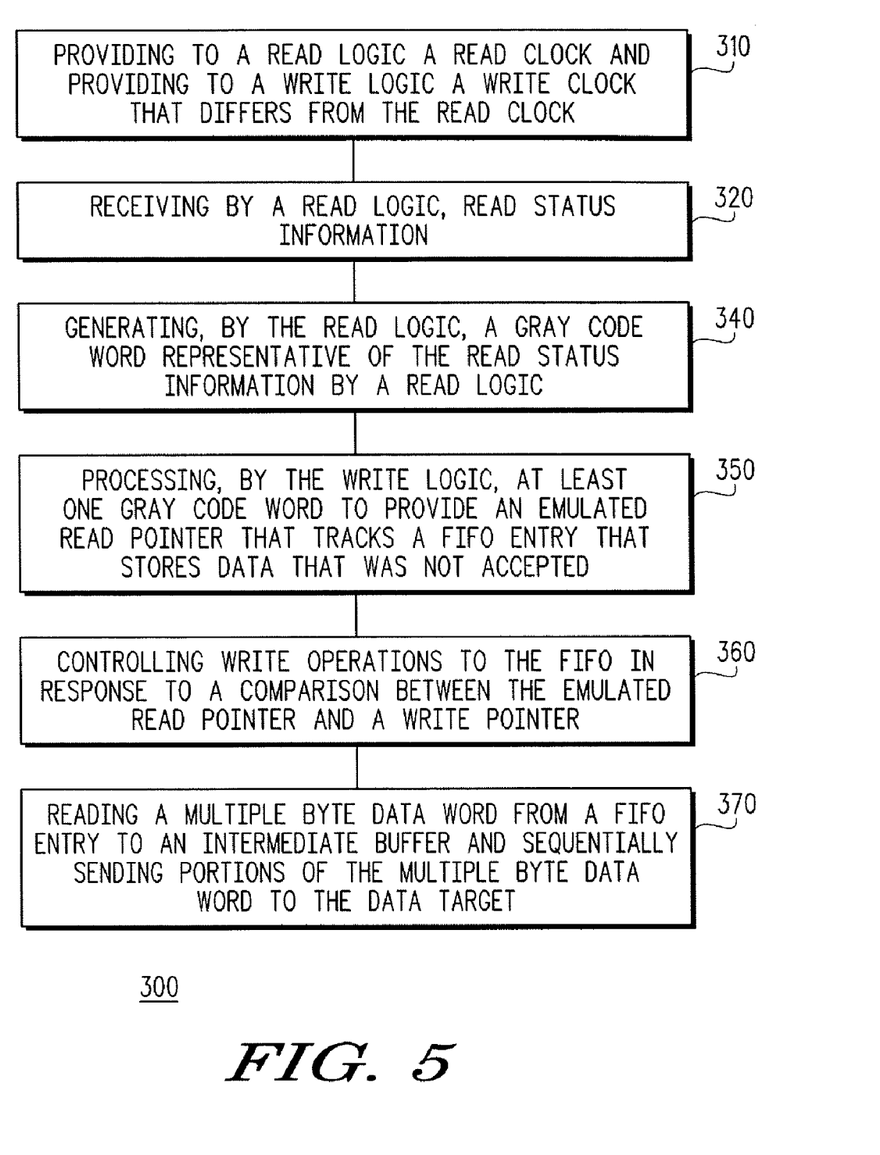
FIG. 5 is a flow chart of a method for managing a retry FIFO, according to an embodiment of the invention.

FIG. 5 is a flow chart of method 300 for managing a FIFO, according to an embodiment of the invention.

Method 300 starts by stage 310 of providing to a read logic a read clock and providing to a write logic a write clock that differs from the read clock. Conveniently the read clock is much slower than the write clock.

Stage 310 is followed by stage 320 of receiving by a read logic, read status information. The read status information reflects various read related operations such as read, acceptance of read data, request to perform a retransmission. Referring to the example set forth in FIG. 2 this read status information can include signals 111-117 or signals 161-171.

Stage 320 is followed by stage 340 of generating, by the read logic, a gray code word representative of the read status information by a read logic.

Stage 340 is followed by stage 350 of processing, by the write logic, at least one gray code word to provide an emulated read pointer that tracks a FIFO entry that stores data that was not accepted.

Conveniently, stage 350 of processing includes comparing between a current gray code word and a previous gray code word. An exemplary comparison and its results are illustrated by TABLE 2.

Conveniently, stage 350 of processing includes providing an emulated read pointer that points to a first FIFO entry that stores data that was not accepted.

Conveniently, stage 350 includes updating a shadow counter.

Stage 350 is followed by stage 360 of controlling write operations to the FIFO in response to a comparison between the emulated read pointer and a write pointer.

Conveniently, stage 360 of controlling includes providing a FIFO full indication. Additionally or alternatively, stage 360 includes providing an indication of a number of empty FIFO entries.

Stages 320-360 represent various FIFO control stages. These stages are repeated when read related operations occur. It is noted that in parallel to stages 320-360 additional stages can occur, including stages of writing data to the FIFO and stages of updating the read pointer to reflect the read stat information. For example if a retry occurs the read pointer within the read logic is updated. This is illustrated by stage 390 that follows stage 320.

Stage 390 illustrates an exemplary read operation. Stage 390 includes reading a multiple byte data word from a FIFO entry to an intermediate buffer and sequentially sending portions of the multiple byte data word to the data target 90. The reading as well as the sequential sending are reflected in the read status information.

Stage 390 can include re-transmission of information from the FIFO. It is noted that the re-transmission can occur even if an intermediate buffer is not used.

The previous description referred to a retry pointer and a shadow counter. It is noted that the retry pointer can be replaced by a retry counter and that the shadow counter can be replaced by a shadow pointer without departing from the spirit of the invention.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device comprising:
   a FIFO memory unit, a read pointer, a retry pointer and a write pointer;
   a gray code state machine coupled to an emulated read pointer logic;
   whereas the gray code state machine is adapted to provide a gray code word representative of a state of a read logic that comprises the read pointer;
   whereas the emulated read pointer logic is adapted to process at least one gray code word and to provide an emulated read pointer that tracks a FIFO entry that stores data that was not accepted; and
   whereas the emulated read pointer logic is coupled to a write control logic adapted to control writing operations to the FIFO memory unit in response to the emulated read pointer logic.

2. The device according to claim 1 whereas the emulated read pointer logic is adapted to compare between a current gray code word and a previous gray code word.

3. The device according to claim 1, whereas the write control logic is adapted to provide a FIFO full indication.

4. The device according to claim 1, whereas the write control logic is adapted to provide an indication about the number of empty FIFO memory unit entries.

5. The device according to claim 1, further adapted to read a multiple byte data word from a FIFO memory unit entry to an intermediate buffer and to sequentially send portions of the multiple byte data word to the data target.

6. The device according to claim 1, whereas the read logic comprises a retry pointer and the emulated read pointer logic comprises a shadow counter.

7. The device according to claim 1, whereas the emulated read pointer represents a first FIFO memory unit entry that stores data that was not accepted.

8. The device according to claim 1, whereas the read logic receives a read clock that differs from a write clock provided to the emulated read pointer logic and to the write control logic.

9. The device according to claim 1, wherein the device is adapted to re-transmit data from the FIFO memory unit.

10. A method that comprises;
    receiving, by a read logic, read status information;
    providing to a read logic a read clock and providing to a write logic a write clock;
    generating a gray code word representative of the read status information by a read logic;
    processing, by the write logic, at least one gray code word to provide an emulated read pointer that tracks a FIFO memory unit entry that stores data that was not accepted; and
    controlling write operations to the FIFO in response to a comparison between the emulated read pointer and a write pointer.

11. The method according to claim 10 whereas the stage of processing comprises comparing between a current gray code word and a previous gray code word.

12. The method according to claim 10, whereas the controlling comprises providing a FIFO full indication.

13. The method according to claim 10, whereas the controlling comprises providing an indication of a number of empty FIFO memory unit entries.

14. The method according to claim 10, further comprising reading a multiple byte data word from a FIFO memory unit entry to an intermediate buffer and sequentially sending portions of the multiple byte data word to the data target.

15. The method according to claim 10, whereas the controlling comprises updating a shadow counter.

16. The method according to claim 10, whereas the stage of processing comprises providing an emulated read pointer that points to a first FIFO memory unit entry that stores data that was not accepted.

17. The method according to claim 10, whereas the read clock differs from the write clock.

18. The method according to claim 10, further comprises re-transmitting information from the FIFO memory unit.

19. The method according to claim 11, whereas the controlling comprises providing a FIFO full indication.

20. The method according to claim 11, whereas the controlling comprises providing an indication of a number of empty FIFO memory unit entries.

* * * * *